United States Patent [19]
Garard et al.

[11] 3,737,102
[45] June 5, 1973

[54] CORROSION RESISTANT ROCKET NOZZLE

[75] Inventors: Richard S. Garard; William J. Mertens, both of Richmond, Ind.

[73] Assignee: Avco Corporation, Richmond, Ind.

[22] Filed: Sept. 21, 1970

[21] Appl. No.: 73,738

[52] U.S. Cl. ............................. 239/265.15, 60/200 A
[51] Int. Cl. ............................................. B64d 33/04
[58] Field of Search .................................. 239/265.15; 60/200 A

[56] References Cited

UNITED STATES PATENTS

| 3,545,679 | 12/1970 | McAllister | 239/265.15 |
| 3,048,972 | 8/1962 | Barlow | 239/265.15 |
| 3,253,403 | 5/1966 | Hayes | 239/265.15 |
| 3,313,488 | 4/1967 | Lovingham | 239/265.15 X |
| 3,194,013 | 7/1965 | Dagneau et al. | 239/265.15 UX |

Primary Examiner—Allen N. Knowles
Assistant Examiner—John J. Love
Attorney—Charles M. Hogan and Eugene C. Goodale

[57] ABSTRACT

A corrosion resistant rocket nozzle for small rocket motors is disclosed. The rocket nozzle has a layer of hard anodize coating on the nozzle surface to reduce the effect of erosion during rocket burning. An ablative layer is placed over the anodize coating to produce a layer of cool gases alongside the nozzle walls during burning.

1 Claim, 4 Drawing Figures

PATENTED JUN 5 1973 3,737,102

INVENTORS.
RICHARD S. GARARD
WILLIAM J. MERTENS
BY
Charles M. Hogan
Eugene C. Hoodle
ATTORNEYS.

3,737,102

CORROSION RESISTANT ROCKET NOZZLE

BACKGROUND OF THE INVENTION

This invention relates to nozzles and more particularly to rocket nozzles having enhanced corrosion resistant qualities.

Small rocket motors are characterized by relatively expensive nozzles. Although the major portion of a rocket motor is well suited for mass production techniques; generation of high temperature gases that must flow under precisely controlled high pressure conditions require use of expensive materials in the nozzle area. In most cases, a high grade of graphite is used as a nozzle. This must be machined separately from the motor case and, through precise use of fitting and adhesive techniques, added to the motor body.

Ideally, a rocket nozzle would be machined directly in the aluminum rocket motor. Such a nozzle would be easier to control dimensionally and eliminate time-consuming assembly. Bare aluminum, however, will not withstand the hot gas flow without erosion and corrosion.

Accordingly, it is an object of this invention to provide an improved rocket nozzle which overcomes the problems presently existing in similar type rocket nozzles.

SUMMARY OF THE INVENTION

This invention provides an improved rocket nozzle having increased erosion and corrosion resistant qualities. The rocket nozzle has a first coating to substantially reduce the effects of erosion during burning and second coating over the first coating which will ablate during burning to produce a layer of cool gases which flow alongside the nozzle walls.

Other details, uses, and advantages of this invention will become apparent as the following description of the exemplary embodiment thereof presented in the accompany drawings proceeds.

BRIEF DESCRIPTION OF THE DRAWINGS

The accompanying drawings show a present exemplary embodiment of this invention in which.

DESCRIPTION OF THE ILLUSTRATED EMBODIMENT

Figure 1:
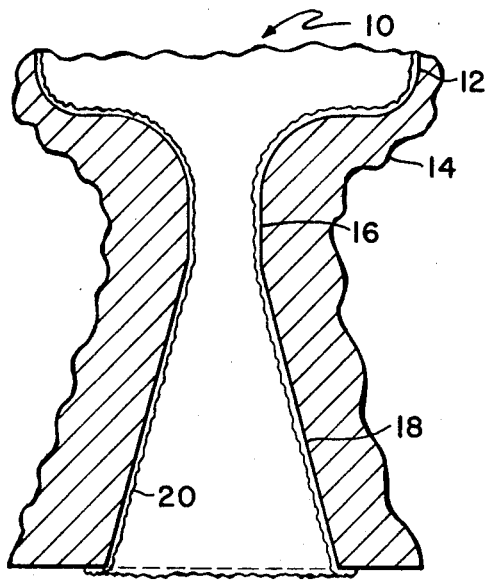
FIG. 1 is a cross-sectional view of the nozzle showing the relative roughness of the surface after the first coating.

Reference is now made to FIG. 1 which illustrates one exemplary embodiment of the corrosion resistant rocket nozzle of this invention, which is designated generally by the reference numeral 10. The nozzle member 10 is provided with an annular inlet portion 12. In the preferred form of this invention, the rocket nozzle is formed integrally with the rocket body 14 which is manufactured preferably out of an aluminum or an aluminum alloy. Although the rocket nozzle described herein is integral with the rocket motor, it should be understood that the nozzle may be formed separately and have suitable means, such as threads or the like thereon, to facilitate the attachment of the nozzle assembly to the body portion of the rocket.

The inlet portion 12 of the nozzle extends forwardly and blends into a reduced throat portion 16 which, in turn, is integral with a generally conically shaped outwardly flaring nozzle outlet section 18.

A hard anodize coating 20 is applied so as to cover the entire inlet portion 12, reduced throat portion 16 and conical outlet portion 18 of the nozzle. The coating 20 is applied by any suitable process, such as by the Martin hardcoat process. This process produces a thick, dense, hard anodic coating on aluminum alloys. The hard coating consists principally of aluminum oxide with the desired properties obtained by thickness and compactness of the coating. The aluminum oxide coating is a hard material which is also a good heat insulator and thus insulates the parent metal 14 for a short time. However, during firing or burning of the rocket, the temperature of the coating 20 increases quite rapidly and the heat is conducted to the parent metal 14. The heat conducted to the parent metal or nozzle 14 permits the coating 20 to be burned off by the gas stream at which point erosion of the parent metal 14 occurs. It can be seen that the coating 20 is porous and uneven on the side exposed to the high temperature gas. The rough condition of the coating surface generates turbulent gas flow thereby accelerating erosion.

Figure 2:
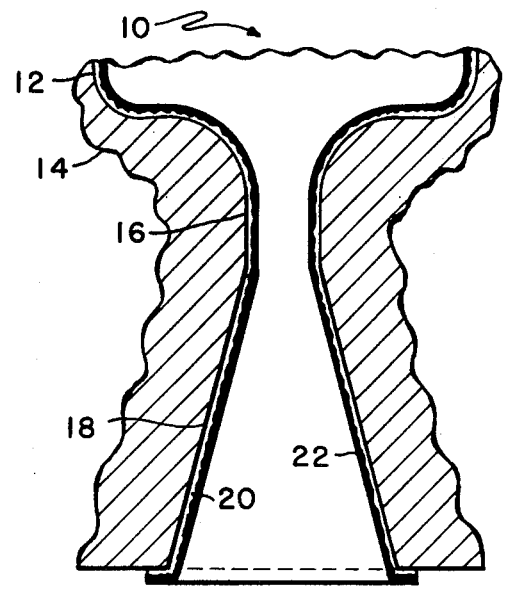
FIG. 2 is a cross-sectional view of the nozzle of FIG. 1 showing the smooth surface after application of the ablative coating.

To overcome this disadvantage of the coating 20, a high temperature enamel 22 is applied over the hard coating 20, as seen in FIG. 2, on all surfaces which are subjected to gas flow. A smooth surface is created over the entire nozzle area which is subjected to the high temperature gases with an increased reservoir of enamel being on the upper end of the nozzle, i.e., the reduced throat portion 16 and inlet portion 12.

High temperature enamel 22 which has been used with good results is DuPont Dulux No. 631-89, blue engine enamel. The enamel performs two distinct functions in this invention. The first is that the enamel 22 fills the voids and cavities in the aluminum coating 20 so as to produce a smooth surface to be exposed to the high temperature gases. In addition, the enamel is heat resistant and during the burning of the rocket, the enamel will ablate so as to produce a layer of cool gases that flow alongside the nozzle walls.

Figure 3:
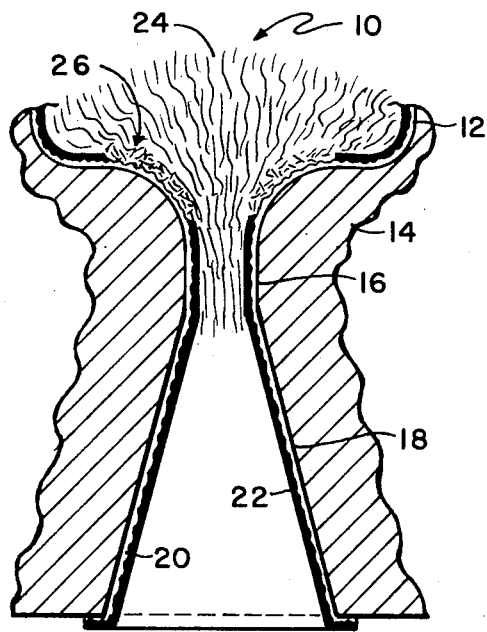
FIG. 3 shows the nozzle of FIGS. 1 and 2 during initial burn conditions.
Figure 4:
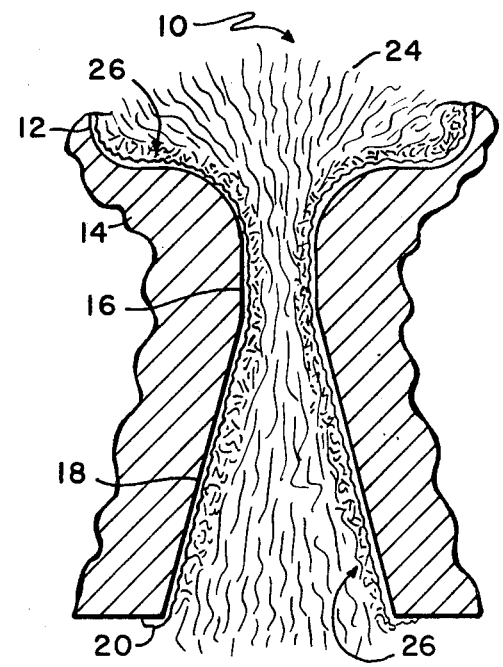
FIG. 4 shows the nozzle of FIGS. 1 and 2 during maximum gas flow during burning.

Referring now to FIG. 3, the nozzle 10 is shown during the initial burn conditions. The smooth surface provided by the enamel 22 allows uniform flow of high temperature gases, shown generally by 24, during the initial burn. Thereafter, as the surface temperature of the enamel 22 rises, the enamel 22 will begin to ablate which produces relatively cool gases 26 which are added to the high temperature gas flow. Since the cooler gases 26 form on the entire surface coated by the enamel 22 at the inlet end, the gases would tend to remain along the surface of the nozzle as seen in FIG. 4 which illustrates the maximum gas flow during the rocket burning. Thus, the cool layer of gas 26 shields the coating 20 from high temperature gases as both the high temperature gas 24 and cool gas 26 are accelerated out of the rocket. The shielding effect of the cool gases helps to keep the temperature of the coating 20 sufficiently low to prevent burn off of the coating. Thus, with the coating 20 remaining, corrosion or erosion of the parent metal 14 is prevented. The thickness of the high temperature enamel is designed such that sufficient cool gases are produced continuously throughout the burning time. Variations of this thickness are thereby a function of the characteristic burning time and flame temperature of the particular propellant being used.

Thus it can be seen that a rocket motor nozzle may be produced and used during the rocket burning without the normally required carbon insert.

While a present exemplary emobidment of this invention has been illustrated and the method of producing the invention has been described, it will be recognized that this invention may be otherwise variously embodied and practiced by those skilled in the art.

What is claimed is:

1. A rocket nozzle having an improved corrosion resistant quality comprising:

a nozzle member defining an inlet portion, a reduced throat portion and an outlet portion;

a hard anodize coating on the inner surface of said nozzle member; and a high temperature enamel ablative coating applied over said hard anodize coating at least covering the entire inlet portion and throat portion, said enamel coating being of greater thickness at the nozzle inlet portion and reduced throat portion wherein said ablative coating is in contact with the high temperature gases of the rocket during burning whereby ablation of the enamel coating upstream of the throat portion produces a layer of cool gases which flows between the high temperature gases and the anodize coating and acts as a moving insulator therebetween.

* * * * *